United States Patent

Lauer

(10) Patent No.: US 12,245,232 B2
(45) Date of Patent: Mar. 4, 2025

(54) LINK SERVICE PROFILE FOR PREDICTIVE SERVICE CONTROL FOR PROVIDING COMMUNICATION SERVICES TO MOBILE DEVICES ON A VEHICLE

(71) Applicant: GOGO BUSINESS AVIATION LLC, Broomfield, CO (US)

(72) Inventor: Bryan Adrian Lauer, Chicago, IL (US)

(73) Assignee: GOGO BUSINESS AVIATION LLC, Broomfield, CO (US)

(*) Notice: Subject to any disclaimer, the term of this patent is extended or adjusted under 35 U.S.C. 154(b) by 658 days.

(21) Appl. No.: 17/226,204

(22) Filed: Apr. 9, 2021

(65) Prior Publication Data

US 2021/0335135 A1 Oct. 28, 2021

Related U.S. Application Data

(60) Provisional application No. 63/014,514, filed on Apr. 23, 2020.

(51) Int. Cl.
*G08B 21/00* (2006.01)
*H04W 28/02* (2009.01)
(Continued)

(52) U.S. Cl.
CPC ....... *H04W 72/20* (2023.01); *H04W 28/0268* (2013.01); *H04W 28/24* (2013.01)

(58) Field of Classification Search
CPC . H04W 72/20; H04W 28/0268; H04W 28/24; H04W 28/0247; H04W 4/42;
(Continued)

(56) References Cited

U.S. PATENT DOCUMENTS 7,853,255 B2    12/2010    Karaoguz et al.
7,904,244 B2    3/2011     Sugla
(Continued)

FOREIGN PATENT DOCUMENTS

JP    2003078429 A  *  3/2003

OTHER PUBLICATIONS

International Application No. PCT/US2021/026511, International Search Report and Written Opinion, mailed Jun. 24, 2021.
(Continued)

*Primary Examiner* — Mark S Rushing
(74) *Attorney, Agent, or Firm* — MARSHALL, GERSTEIN & BORUN LLP; Randall G. Rueth

(57) ABSTRACT

Systems and methods for modifying application performance in view of link conditions are provided. An example method includes predicting respective link rates of at least one link of a plurality of links that deliver data to and from a vehicle while the vehicle is moving from an origination point to a destination point. The predicting is based on historical link characteristics. The method further includes generating a link service profile of the vehicle based on the predicted respective link rates and a route of the vehicle. In addition, the method includes receiving a request for information related to the link service profile from a mobile device and transmitting, to the mobile device, an indication based on the link service profile, thereby causing a modification of a behavior of an application executing at the mobile device based on the link service profile.

12 Claims, 8 Drawing Sheets

(51) Int. Cl.
 *H04W 28/24* (2009.01)
 *H04W 72/20* (2023.01)
(58) Field of Classification Search
 CPC ..... H04W 28/10; H04W 40/12; H04W 40/18; H04L 67/12
 USPC .................................................. 340/539.21
 See application file for complete search history.

(56) References Cited

U.S. PATENT DOCUMENTS

| | | |
|---|---|---|
| 7,984,190 B2 | 7/2011 | Rhoads |
| 8,306,013 B2 | 11/2012 | Chiang |
| 8,402,356 B2 | 3/2013 | Martinez et al. |
| 8,805,751 B2 | 8/2014 | Ortiz |
| 9,031,498 B1 * | 5/2015 | Bertz ................ H04W 72/04 340/539.22 |
| 9,071,628 B2 | 6/2015 | Milburn et al. |
| 9,407,034 B2 | 8/2016 | Sizelove et al. |
| 9,465,679 B2 | 10/2016 | Stanley-Marbell et al. |
| 9,800,694 B2 | 10/2017 | Peng et al. |
| 2003/0093798 A1 | 5/2003 | Rogerson |
| 2005/0216938 A1 | 9/2005 | Brady et al. |
| 2008/0181169 A1 * | 7/2008 | Lauer .................. H04W 84/005 370/316 |
| 2008/0209031 A1 | 8/2008 | Zhu et al. |
| 2010/0125867 A1 * | 5/2010 | Sofos ................... H04N 21/835 725/28 |
| 2010/0189089 A1 | 7/2010 | Lynch et al. |
| 2012/0039248 A1 * | 2/2012 | Schneider ........... H04W 84/005 370/328 |
| 2013/0097101 A1 * | 4/2013 | Ortiz ..................... G06Q 30/02 706/46 |
| 2015/0081532 A1 | 3/2015 | Lewis et al. |
| 2015/0120087 A1 | 4/2015 | Duan et al. |
| 2018/0204237 A1 | 7/2018 | Jafri |
| 2019/0036630 A1 * | 1/2019 | Svennebring ......... H04W 40/12 |
| 2019/0319840 A1 | 10/2019 | Cheng et al. |
| 2020/0077278 A1 * | 3/2020 | Jornod ................. H04W 16/18 |
| 2022/0228874 A1 * | 7/2022 | Nader ................ G01C 21/3461 |
| 2023/0074288 A1 * | 3/2023 | Filippou ........... H04W 28/0236 |

OTHER PUBLICATIONS

Communication pursuant to Article 94(3), European patent application No. 21 720 945.1, dated Nov. 7, 2023.

* cited by examiner

Link Service Profile
364

| Time 325 | Event 326 | Link Rate 327 | Cost 328 |
|---|---|---|---|
| $t_1$ | Start Of Flight | 10 Mbps | 3 |
| $t_2$ | In Flight | 15 Mbps | 5 |
| $t_3$ | In Flight | 8 Mbps | 5 |
| $t_4$ | Leave Coverage | 0 Mbps | NA |
| $t_5$ | Enter Coverage | 5 Mbps | 7 |
| $t_6$ | Start Beam Switch | 0 Mbps | NA |
| $t_7$ | End Beam Switch | 0 Mbps | NA |
| $t_8$ | In Flight | 10 Mbps | 3 |
| $t_9$ | End Of Flight | 10 Mbps | 7 |

FIG. 3

LINK SERVICE PROFILE FOR PREDICTIVE SERVICE CONTROL FOR PROVIDING COMMUNICATION SERVICES TO MOBILE DEVICES ON A VEHICLE

CROSS-REFERENCE TO RELATED APPLICATIONS

This application claims the benefit of U.S. Provisional Patent Application No. 63/014,514, filed on Apr. 23, 2020, the entirety of which is hereby incorporated herein by reference.

TECHNICAL FIELD

This disclosure relates generally to communication systems that distribute data to and from a moving vehicle via links and, more particularly, to generating link service profiles to modify the behavior of applications executing at devices connected to the links.

BACKGROUND

Many vehicles contain communications equipment that provide internet services to devices on-board the vehicle. Because the vehicle may move in and out of different types of coverage areas, the performance and reliability (i.e., mobile quality of service (QoS)) of wireless communications may vary as the vehicle movies. Interruptions in the quality and reliability of services may cause applications to run ineffectively and inefficiently when relying on internet services on-board the vehicle.

In particular, applications executing at user devices are unaware of the changes and interruptions in internet service. Instead, applications typically assume a steady, stable internet connection and do not operate differently from how they would operate in a traditional wireless network outside the vehicle. For example, an application may not understand what application capabilities will actually function during the trip. As a result of the application's confusion, the application may present options to the user that may not perform as expected given the internet service available on the vehicle. This leaves the user confused and disappointed during the course of the trip. As a further example, an application may attempt to perform downloads during gaps in coverage, resulting in decreased application efficiency and diminished user experience.

Accordingly, it is desirable to provide an effective method to optimize the efficiency and usability of the applications while the vehicle is in motion.

BRIEF SUMMARY OF THE DISCLOSURE

This summary is provided to introduce a selection of concepts in a simplified form that are further described in the Detailed Description. This summary is not intended to identify key features or essential features of the claimed subject matter, nor is it intended to be used to limit the scope of the claimed subject matter.

In one embodiment, a method for modifying application performance in view of link conditions is provided. The method includes predicting, by a computing device of a system that provides communication services to mobile devices on-board vehicles, respective link rates of at least one link of a plurality of links. The plurality of links may deliver data to and from the vehicle while the vehicle is moving from an origination point to a destination point. The predicting may be based on historical link characteristics. The method also may include generating a link service profile of the vehicle based on the predicted respective link rates of the at least one link and a route of the vehicle between the origination point and the destination point. The method may further include receiving a request for information related to the link service profile from a mobile device and transmitting an indication based on the link service profile to the mobile device, thereby causing a modification of a behavior of an application executing at the mobile device based on the link service profile while the vehicle is traversing the route.

In another embodiment, a computer-implemented method performed by a mobile device to modify application performance in view of link conditions is provided. The method includes transmitting, to a computing device associated with a vehicle, a request for information related to a link service profile. The link service profile may include predicted respective link rates of at least one link of a plurality of links for delivering data to and from the vehicle while the vehicle is moving from an origination point to a destination point. The method may further include receiving, from the computing device, an indication based on the link service profile and modifying, based on the indication based on the link service profile, a behavior of an application executing on the mobile device while the mobile device is on-board the vehicle.

In still another embodiment, a non-transitory computer-readable storage medium storing processor executable instructions may be provided. The instructions, when executed, cause one or more processors to transmit, to a computing device associated with a vehicle, a request for information related to a link service profile. The link service profile includes predicted respective link rates of at least one link of a plurality of links for delivering data to and from the vehicle while the vehicle is moving from an origination point to a destination point. The instructions also may cause the processors to receive, from the computing device, an indication based on the link service profile and modify, based on the indication, a behavior of an application executing on the mobile device while the mobile device is on-board the vehicle.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3 is a block diagram of an example link service profile which may be generated and provided to user devices on board a vehicle, such as the vehicle depicted in FIG. 3;

DETAILED DESCRIPTION

Figure 1A:
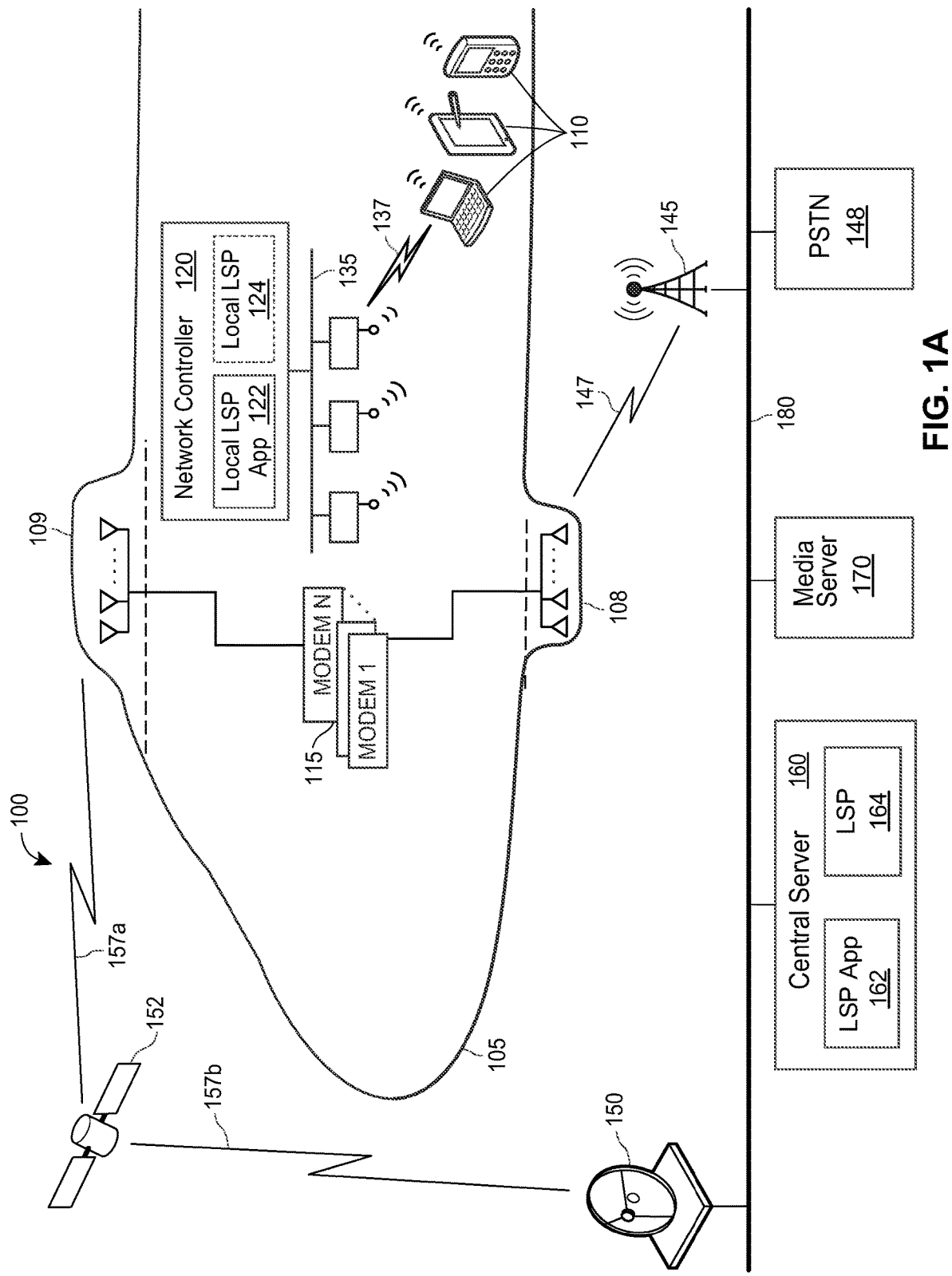
FIGS. 1A-1B depict an embodiment of an example communication system capable of performing the techniques disclosed herein for modifying application performance in view of link conditions.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Traditionally, applications executing on user devices on-board vehicles utilize on-board networks to provide various functionalities, such as streaming video, sending messages, and web browsing. Vehicles may provide on-board networks communicatively coupled to external communication links, such as satellite communication links or air-to-ground (ATG) communication links in the case where the vehicle is an aircraft. As a vehicle travels, however, the quality of the external communication links delivering data to and from the vehicle may vary. Conventionally, user devices are not aware of changing link conditions ahead of time, nor is predictive information about changing link conditions considered. Applications assume a steady-state internet connection. Accordingly, the applications may attempt to execute functions that will not be supported and/or operate poorly during the vehicle's journey due to gaps and degradations in coverage, wasting computational resources. Thus, a user may be confused when an applicant presents an indication to a user that these capabilities are available for normal usage. The user may attempt to click on or select these capabilities, for example, that are unavailable at the current internet connection.

The techniques disclosed herein may include both (1) generating predictive information concerning link rates during a route of a vehicle, and (2) causing applications modify their behavior by enabling user devices to access the predictive information. As mentioned previously, external communication links may deliver information to and from a vehicle while the vehicle is moving. By analyzing historical link characteristics of external communication links that provided communication services to vehicles during routes of the vehicles, a computing device may predict what the link rates and/or other link characteristics will be on a planned route of a vehicle. In particular, the computing device may predict the link characteristics for the route based on the historical link characteristics and store them in a link service profile. In some embodiments, the computing device also updates the link service profile based on real-time changes in link conditions.

User devices on-board the vehicle may access the link service profile prior to and/or during the route. Applications of the user devices may then modify their behavior in accordance with the link characteristics included in the link service profile. As one example, if the link service profile indicates a low link rate unsuitable for video streaming at a particular time during the route, the application may cache the video data in anticipation of the lower link rate. The application may also notify the user that the capability is unavailable, such as by "greying out" a video streaming capability or otherwise notifying the user that the capability is or will be unavailable. Accordingly, the disclosure herein improves the functioning of applications executing on devices disposed on-board vehicles.

Figure 1B:
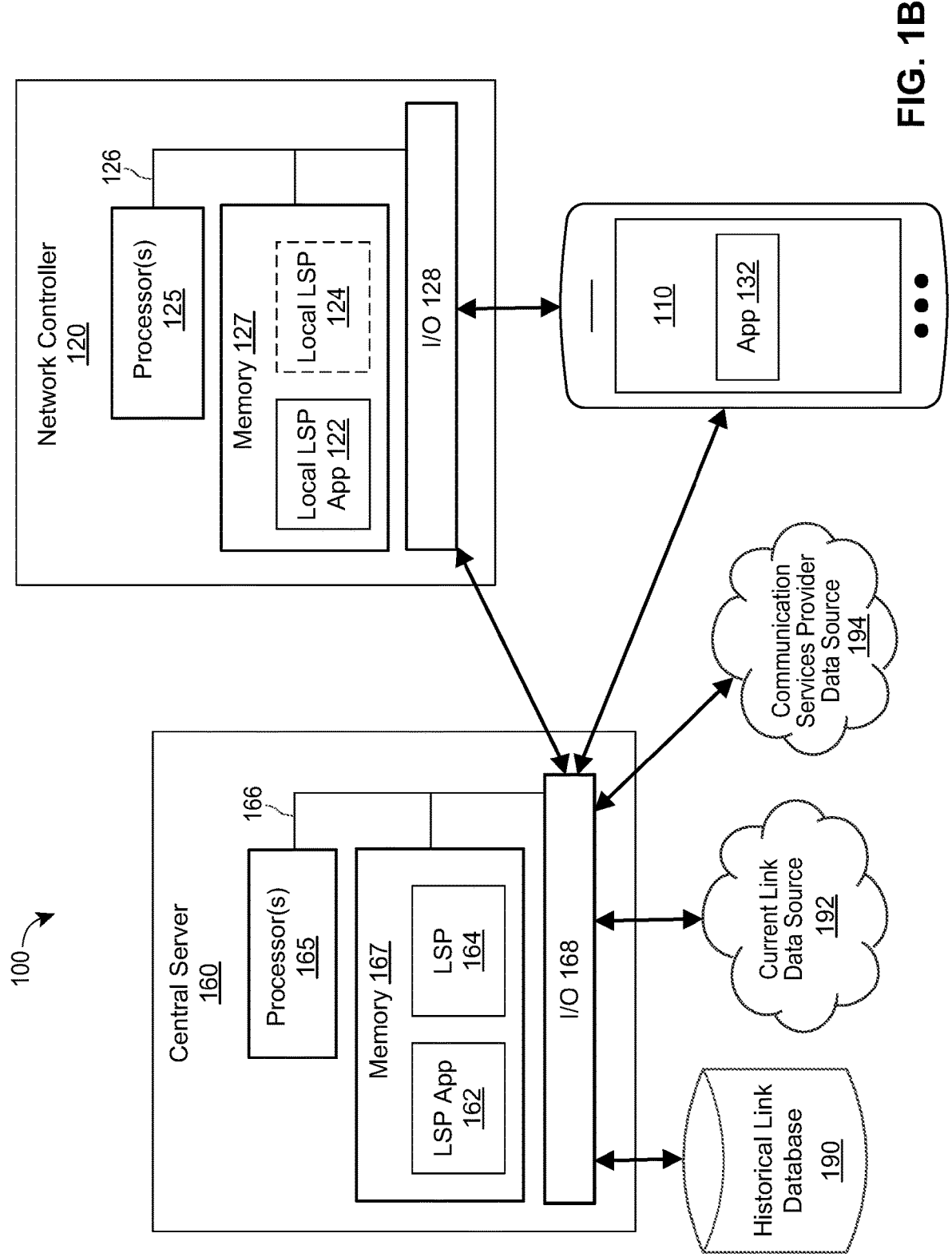

FIGS. 1A-1B depict an environment 100 that includes an example communication system capable of performing the techniques disclosed herein for modifying application performance in view of external communication link conditions. As depicted in FIG. 1A, the environment 100 may include a vehicle 105. Although the vehicle 105 is depicted as a an airplane, it is envisioned that the vehicle 105 may be any vehicle, for example, a bus, a train, a subway, a helicopter, a ship, a balloon, etc. Further, although FIG. 1A only illustrates a single vehicle 105, in other embodiments, the environment 100 may include any number of vehicles configured similarly configured as the vehicle 105.

The vehicle 105 may be in communication with one or more links for delivering data to and from the vehicle 105. In particular, the one or more links may include: an on-board communication link 137 to provide communication services to user devices 110 while the user devices 110 are disposed within the vehicle 105, an air-to-ground (ATG) communication link 147 of an ATG network, and a satellite communication link 157 (comprised of (a) a satellite communication link 157a between the vehicle 105 and a satellite 152 and (b) a satellite communication link 157b between the vehicle 105 and a satellite ground station 150, collectively referred to herein as the satellite communication link 157) of a satellite communication system. The ATG communication link 147 may be between the vehicle 105 and a terrestrial base station 145 connected to a public switched telephone network (PTSN) 148. Although the ATG communication link 147 and the satellite communication link 157 are referred to herein in the singular tense, it should be appreciated that other network configurations are envisioned. For example, the vehicle 105 may be associated with multiple ATG communication links, multiple satellite communication links, and/or other types of communication links.

As illustrated, the vehicle 105 may include one or more modems 115 configured to be compatible with a plurality of different communication standards utilized by the on-board communication link 137, the ATG communication link 147, and the satellite communication link 157. For example, the on-board communication link 137, the ATG communication link 147, and the satellite communication link 157 may utilize communication protocols (e.g., TDMA, GSM, CDMA, LTE, WiMAX, NR, Wi-Fi, etc.) at respective frequency bands (e.g., $K_a$ band, $K_u$ band, L band, S band, cellular band, AWS band, PCS band, an unlicensed band, etc. and/or any other suitable wireless communication frequency bands). In the illustrated embodiment, the transceivers 109 may be adapted for communication via one or more satellite communication links 157 (e.g., using a modem 115 that supports satellite communication frequency bands) and the transceivers 108 may be adapted for communication with the base station 145 via the communication link 147. Each of the plurality of modems 115 may be connected to at least one transceiver (e.g., a transceiver of transceivers 108 or transceivers 109) and/or on-board wireless access points 135 configured to receive/transmit signals utilizing any supported communication protocol. It should be appreciated that although certain communication protocols are more suitable for use in one of the on-board communication link 137, the ATG communication link 147, or the satellite communication link 157, this does not preclude the additional or alternative use of the communication protocol for the less suitable communication link.

As illustrated, the vehicle 105 is also equipped with a network controller 120, that is operatively connected to the on-board wireless access points 135 and the modems 115. The network controller 120 supports communications external to the vehicle 105 via the communication links 147, 157 and manages an on-board network provided by the on-board communication link 137.

Generally speaking, the user devices 110 may send and receive data over the on-board communication link 137 via the on-board wireless access points 135. The user devices 110 may include any mobile computing device, such as a smartphone, a tablet, a laptop computer, a personal digital assistant, an e-reader, smart glasses, a smart watch, or any other mobile computing device capable of wireless communications. The plurality of modems 115 may determine that some of the data transmitted by the user devices 110 is addressed to a location external to the vehicle 105. Accordingly, the plurality of modems 115 may forward and/or transmit this data to the base station 145 via the ATG communication link 147 (or to the satellite ground station 150 via the satellite communication link 157) for routing to the data's ultimate destination.

The base station 145 and the satellite ground station 150 may be connected to a network backbone 180, which may include a terrestrial cellular or radio network, for example. The network backbone 180 may communicatively connect the base station 145 and the satellite ground station 150 to a central server 160. The network backbone 180 may also connect a media server 170. The media server 170 stores content that users on-board the vehicle 105 may access via the on-board network. The central server 160 may be associated with a provider of communication services to vehicles and/or mobile devices on-board vehicles. The central server 160 includes a link service profile (LSP) application 162 that may generate an LSP 164, portions of the LSP 164, and/or updates to the LSP 164 stored thereat.

Likewise, the network controller 120 may also include an LSP application 122 that interfaces with LSP application 162 of the central server 160. In some embodiments, the LSP application 122 stores a local version 124 of the LSP 164. In these embodiments, the LSP application 122 may generate the local LSP 124, portions of the local LSP 124, and/or updates to the local LSP 124. Additionally, the LSP application 122 may route requests for and/or otherwise obtain data from the LSP 164 of the central server 160.

FIG. 1B depicts additional details of the environment 100. In various embodiments, the LSP 164 and/or the local LSP 124 may include link rates that are predicted or expected during a route of the vehicle 105. For example, in the case where the vehicle 105 corresponds to an aircraft, the LSP 164 and/or the local LSP 124 may include predicted link rates of the links that will be communicatively connected to the vehicle during the flight. The LSP 164 and/or the local LSP 124 may include predicted link rates for only one link, such as the satellite communication link 157, ATG communication link 147, or on-board communication link 137, or may include predicted link rates of several links. If the link is a bi-directional link, the predicted link rates may include both uplink and/or downlink rates. Further, the LSP 164 or the local LSP 124 may include other predicted link characteristics and/or parameters, such as peak information rate, round-trip time or latency, status, usage rate, times of planned outages, or cost. The cost parameter may indicate how expensive a link is for the communication services provider to provide or for the user devices 110 to access to facilitate least cost routing techniques.

The central server 160 may generate and store the LSP 164. The central server 160 includes one or more processor (s) 165. The processors 165 may include central processing units (CPUs), graphics processing units (GPUs), application-specific integrated circuits (ASICS), and/or any other types of computer processors. It should be appreciated that while FIGS. 1A-1B illustrate the central server 160 as a single entity, in other embodiments, the central server 160 may be multiple entities acting in conjunction with one another. For example, in some embodiments, the central server 160 is partially or wholly implemented in a distributed computing environment, such as a cloud computing environment. In these embodiments, the processors 165 may be physically located in different hardware entities.

In addition to the processors 165, in the illustrated embodiment the central server 160 also includes at least one memory 167 and an input/output (I/O) circuit 168, all of which may be interconnected via an address/data bus 166. It should be appreciated the memory 167 may include multiple random-access memories (RAMs) and multiple program memories implemented as any type of memory, such as semiconductor memory, magnetically readable memory, or optically readable memory, for example. Similarly, although the I/O circuit 168 is shown as a single block, it should be appreciated that the I/O circuit 168 may include a number of different types of I/O circuits. For example, the I/O circuit 168 may include one or more transceiver circuits to facilitate communication with other devices in the environment 100 over, for example, the network backbone 180.

The memory 167 may store an LSP 164 and instructions executable by the processors 165 to form an LSP application 162. The LSP application 162 generates the LSP 164 and processes requests for the LSP 164 from other computing devices, such as the network controller 120. The LSP application 162 generates and/or modifies the LSP 164 based on data received from various data sources via the I/O circuit 168. The data sources may include a historical link database 190, a current link data source 192, and a communication services provider data source 194.

The historical link database 190 includes historical link characteristics of one or more communication links during historical routes of vehicles. For example, a fleet of vehicles (which may or may not include the vehicle 105) may travel a variety of routes while communicatively connected to links such as the links 137, 147, and 157. As the vehicles traverse the routes, data concerning the quality of the links at times and locations during the routes is collected, processed, and stored at the historical link database 190. The data may be collected by computing devices on-board the vehicles, such as a device similar to the network controller 120 of the vehicle 105, and transmitted to computing devices on the ground, such as the central server 160 and/or the historical link database 190. Historical link characteristics may include, for example, link rates, peak information rates, downlink rates, uplink rates, latencies (e.g., round-trip times), link statuses, link costs, times of link outages, and usage rates.

Based on the historical link characteristics and a route of the vehicle 105, the LSP application 162 may predict link rates of the links that will be communicatively connected to the vehicle 105 as it traverses the route. A planned route of a vehicle indicates an origination point, a destination point, and scheduled locations therebetween. The LSP application 162 may determine the link characteristics at various times and locations of a planned route of the vehicle. Based on the historical link characteristics, the LSP application 162 may determine, for those locations and/or times, the historical link rates. Based on these historical link rates, the LSP application 162 may predict what the link rates of the links communicatively connected to the vehicle 105 will be at different times and/or locations during its planned route. Further, in addition to link rates, the LSP application 162 may also predict other link characteristics, such as peak information rates, latencies, link statuses, link costs, usage rates, etc. The LSP application 162 may generate the LSP 164 based on the predicted link rates. An example LSP is discussed below with reference to FIG. 3.

The current link data source 192 includes current link characteristics and information concerning conditions that affect current link characteristics. One or more computing devices located on or off the vehicle, such as the network controller 120, the ground base stations 145 or 150, or the central server 160, may monitor the plurality of links and collect data relating to the current characteristics. For example, the current link data source 192 may include the current link rates of links communicatively connected to the vehicle 105 while the vehicle 105 is traversing a route. Current link characteristics may also include current link statuses, current uplink and/or downlink rates, current peak information rates, current link usages, and current latency times (e.g., round-trip times). The current link data source 192 may also include changes to the planned route of the vehicle, made either prior to the vehicle 105 starting its route or during the route due to traffic or weather conditions. The current link data source 192 may also include information related to the satellites, base stations, and other hardware supporting the links, such as indications of whether a device is experiencing a malfunction. Generally speaking, the current link data source 192 includes information that may indicate any real-time information, including anomalies, relating to the links. The LSP application 162 utilizes data from the current link data source 192 to predict the link rates (and other link characteristics), update the historical link database 190, and/or to update the LSP 164 either directly before or while the vehicle 105 is traversing a route.

The communication services provider data source 194 includes information associated with the communication services provider. For example, the communication services provider may offer different service options that users (e.g., passengers on-board the vehicle 105) may purchase. The service options may correspond to different levels of access to the links with different service capabilities and different prices. For instance, the service options may have different average or peak link rates. The communication services provider data source may include prices, maximum data rates, and types of allowed communications and/or capabilities associated with these different access levels. The LSP application 162 may augment the LSP 164 to indicate predicted link rates at each offered access level.

For simplicity, FIG. 1B depicts the historical link database 190, the current link data source 192, and the communication services provider data source 194 as individual, separate devices. However, it is understood that multiple databases and/or data sources may make up these elements. Multiple different computing devices may form the database 190 and the data sources 192, 194. In some implementations, the functions of the database 190 and the data sources 192, 194 may also be performed by computing devices of the same computing system, such as a computing system of a communication services provider. Further, while not shown explicitly in FIG. 1B, it is understood that the network controller 120 may also have direct access to the database 190 and the data sources 192, 194. The network controller 120 may access the resources 190, 192, and 194 to generate and/or update a local LSP 124, as discussed below.

The LSP application 162 may cause the central server 160 to transmit the generated LSP 164 to the network controller 120 located on-board the vehicle 105. In some scenarios, the LSP application 162 may not transmit the entire LSP 164 to the network controller 120, but rather may transmit portions of the LSP 164 or indications based on the LSP 164. For instance, the central server 160 may transmit only the predicted link rates for one link, or may transmit qualitative descriptions of the link rates, such as "High" or "Low." As another example the central server 160 may transmit the portion of the LSP 164 corresponding to an upcoming segment of the route for a vehicle. Still further, the central server 160 may transmit descriptions of the link rates based on estimated application capabilities, such as "below threshold for video streaming."

The central server 160 may transmit the LSP 164 to the network controller 120 on-board the vehicle 105 before the vehicle 105 begins traversing its route or during the route. For example, if the vehicle 105 is an aircraft, the central server 160 may transmit the LSP 164 to the network controller 120 while the aircraft is at a gate of an airport or otherwise prior to the aircraft's takeoff. The central server 160 may transmit the LSP 164 in response to a request received from the network controller 120, or may push the LSP 164 to the network controller 120 without receiving a request, such as in accordance with a scheduled push. Further, the central server 160 may transmit an updated LSP 164 to the network controller 120 in response to receiving updated information, such as from the current link data source 192. For example, if the LSP application 162 receives updated link information from the current link data source 192 and updates the LSP 164 accordingly, the LSP application 162 may cause the central server 160 to transmit the LSP 164 or an indication based on the LSP 164 to the network controller 120.

As illustrated, the network controller 120 includes one or more processor(s) 125 similar to the processors 165 of the central server 160. The processors 125 may include CPUs, GPUs, ASICS, and/or any other types of computer processors. The network controller also includes at least one memory 127 and an I/O circuit 128, which may be interconnected with the processors 125 via an address/data bus

126, analogous to the central server 160. The I/O circuit 128 may receive information from (and transmit information to) other devices in the environment 100 via the internal communication link 137 and the external communication links 147, 157.

The network controller 120 may store a local LSP 124 based on or equivalent to the received LSP 164. For example, after receiving the LSP 164 from the central server 160, the network controller may store the LSP 164 locally as the local LSP 124. The memory 127 of the network controller 120 may include instructions executable by the processors 125 to form a local LSP application 122. The local LSP application 122 may format requests for information related to the LSP 164 and cause the network controller 120 to transmit the requests to the central server 160. For instance, the local LSP application 122 may transmit a request for the LSP 164, receive the LSP 164 in response, and store the LSP 164 locally as the local LSP 124. The local LSP application 122 also may generate and/or update the local LSP 124 locally on-board the vehicle 105. For instance, the local LSP application 122 may receive information from the current link data source 192 regarding the current state of the links while the vehicle is moving, and may predict characteristics of the links, including link rates, for the remainder of the trip. The local LSP application 122 may update the local LSP 124 with the predicted characteristics based on the current information. The local LSP application 122 also may receive and process requests for information related to the LSP 164 or the local LSP 124 from the user devices 110, as discussed below.

In some embodiments, the network controller 120 may not store a local LSP 124. In these embodiments, the local LSP application 122 may receive requests for information related to the LSP 164 from the user devices 110 and route these requests to the central server 160. The local application 122 then may route information included in the response from the central server 160 to the user devices 110. Similarly, the central server 160 may push information related to the LSP 164 to the network controller 120, and the local LSP application 122 may distribute the information to user devices 110 on-board the vehicle 105 if they are communicatively connected to the on-board network, and, in some scenarios, if the user devices 110 have subscribed to updates regarding the LSP 164.

The user device 110 resides on the vehicle 105 while the vehicle 105 is traversing the route. The user device 110 is configured to execute one or more applications, such as application 132. The application 132 may be stored on one or more memories of the user device 110 and executed by one or more processors of the user device 110. In some embodiments, the application 132 may be a web application or cloud service accessible from the user device 110 via the communication services provided by the on-board network. The application 132 may be, for example, a web browser, mail application, messaging application, calendar application, audio player, video player, gaming application, etc. In some embodiments, the application 132 may be an application provided by the communication services provider. The communication services provider application may allow users to access the on-board network and to purchase different service options. The application 132 also may allow the user to indicate whether the user device 110 should request information related to the LSP 124 or 164.

The user device 110 may receive information related to the LSP 164 or the local LSP 124 in a variety of ways. Prior to being carried onto the vehicle 105 (or after being carried onto the vehicle 105 but before connecting to the on-board network), the user device 110 may transmit a request to the central server 160 for information related to the LSP 164 and/or the LSP 124. The user device 110 may format the request in accordance with an application programming interface (API), which may be provided by the communication services provider. The request may be for any information related to the LSP 164 and/or the local LSP 124, or may be for specific information, such as a link rate at a particular time, or at what times the link rates are predicted to be higher than a given threshold (e.g., a threshold for supporting video streaming). The request may indicate a particular application of the user device and a minimum usable data rate for certain capabilities of the application, and may seek information regarding whether the predicted link rates are higher than the minimum usable data rate. The request may also be for predicted link rates associated with different service options of the communication service provider. Still further, the request may be a subscription request to subscribe to updates regarding the LSP 164 and/or the local LSP 124. The central server 160 may indicate to the network controller 120 that a particular device has subscribed to updates regarding the LSP 164 and/or the local LSP 124.

As one example, the application 132 may provide an interface that enables a user to indicate that the user device 132 should subscribe to updates regarding the LSP 164 and/or the local LSP 124 for an upcoming trip of the user. The application 132 may also automatically determine that a user will be on an upcoming trip on-board a vehicle, and automatically transmit a request for information related to the LSP 164 and/or the local LSP 124 for the route of the upcoming trip. The application 132 may display indications of the requested information to the user. For example, the application 132 may indicate to the user the predicted link rates for various segments of the trip. The application 132 may also indicate to the user predicted link rates for the various service options of the communication services provider, enabling the user to select a service option that will support the capabilities the user plans to rely upon during the trip.

A user associated with a user device 110 also may utilize another device, such as a check-in kiosk or computer, to request information related to the LSP 164 and/or the local LSP 124 prior to a trip. For example, when purchasing a ticket for a trip or when checking in, the user may provide a phone number or other identifier of the user device 110. The check-in kiosk or computer may then transmit a request for the central server 160 to send information relating to the LSP 164 to the user device 110.

The user device 110 may also transmit a request for the LSP 164 and/or the local LSP 124 while located on the vehicle 105. The user device 110 may, in response to connecting to the on-board network, transmit a request to the network controller 120 for information related to the LSP 164 and/or the local LSP 124, similar to the request discussed above transmitted to the central server 160. The user device 110 may format the request in accordance with an API, which may be provided by the communication services provider. The network controller 120 may respond with information based on the local LSP 124. In some scenarios, such as when the network controller 120 does not store a local LSP 124, the network controller 120 may transmit a request for information related to the LSP 164 to the central server 160, and respond to the user device 110 with information received from the central server 160.

The request transmitted by the user device 110 to the network controller 120 may be similar to a request transmitted by the user device 110 to the central server 160. The request may be for any information related to the LSP 164 or the local LSP 124, such as current information included in the LSP 164 or the local LSP 124. The request may also be a subscription request to subscribe to updates regarding the LSP 164 or the local LSP 124. The user device 110 may transmit a request for information, including a subscription request, to the network controller 120 in response to detecting that the user device 110 is on-board the vehicle. For example, the application 132 may be associated with the communication services provider and detect a particular Service Set Identifier (SSID) of the on-board network. The application 132 may also receive updates regarding a flight state of the vehicle (e.g., port state at a gate of an airport, pushing out of a gate, the vehicle going above 10,000 feet, in the case of an aircraft), and may transmit requests for information in response to detecting an updated flight state. Similarly, the user device 110 may transmit a request for information, including a subscription request, to the network controller 120 in response to connecting to the on-board network.

Responsive to a request from the user device 110, the central server 160 or the network controller 120 transmits information relating to the local LSP 124 or the LSP 164 to the user device 110. The central server 160 or the network controller 120 may format the response in accordance with an API, which may be provided by the communication services provider. Still further, the network controller 120 or the central server 160 may broadcast information based on the local LSP 124 or the LSP 164 to the user devices 110 connected to the on-board network, or may only broadcast the information to the user devices 110 that have transmitted subscription requests to the network controller 120 or the central server 160. The network controller 120 or the central server 160 may broadcast the information periodically while the vehicle is moving from the origination point to the destination point (e.g., at time intervals, or when the vehicle reaches certain states, such as flight states in the case of an aircraft). The network controller 120 or the central server 160 may broadcast the information in response to detecting an update to the local LSP 124 or to the LSP 164, such as an update due to a changed route or a network anomaly. In some scenarios, the central server 160 may update the LSP 164, and may transmit an indication of the update to the network controller 120. In response to receiving the updated LSP 164, the network controller 120 may update the local LSP 124 and transmit an indication of the updated local LSP 124 to subscribed user devices.

As mentioned above, the information relating to the LSP 164 or the local LSP 124 transmitted to the user device 110 may be an indication based on the LSP 164 or the local LSP 124 rather than the entire LSP 164 or local LSP 124. Indications based on the LSP 164 or the local LSP 124 may include information reflecting the data contained within the LSP 164 or the local LSP 124. For example, the indication may be a current or predicted link rate, uplink rate, downlink rate, peak information rate, or latency (e.g., a round-trip time). As a further example, the indication may indicate whether the predicted link rates are higher than a given threshold, such as a minimum useable data rate of the application 132. The indication may relate to a specific application, and may indicate a specific capability that is predicted to be unavailable at certain times during the route. The indication may also be a general prediction not related to a specific application but related to a general capability, such as video streaming. For example, the indication may include a prediction that no video services will be available during a particular range of times. The indication also may be a current or predicted status of the links, such as "on-board network predicted to be down," or "on-board network predicted to be up in 10 minutes."

In response to receiving the information related to the LSP 164 or the local LSP 124, applications executing on the user device 110, such as the application 132, may modify their behavior in a way that optimizes the performance of both the applications and the user device 110. Example behavior modifications applications may take are discussed with reference to FIGS. 4A-4B.

Figure 2:
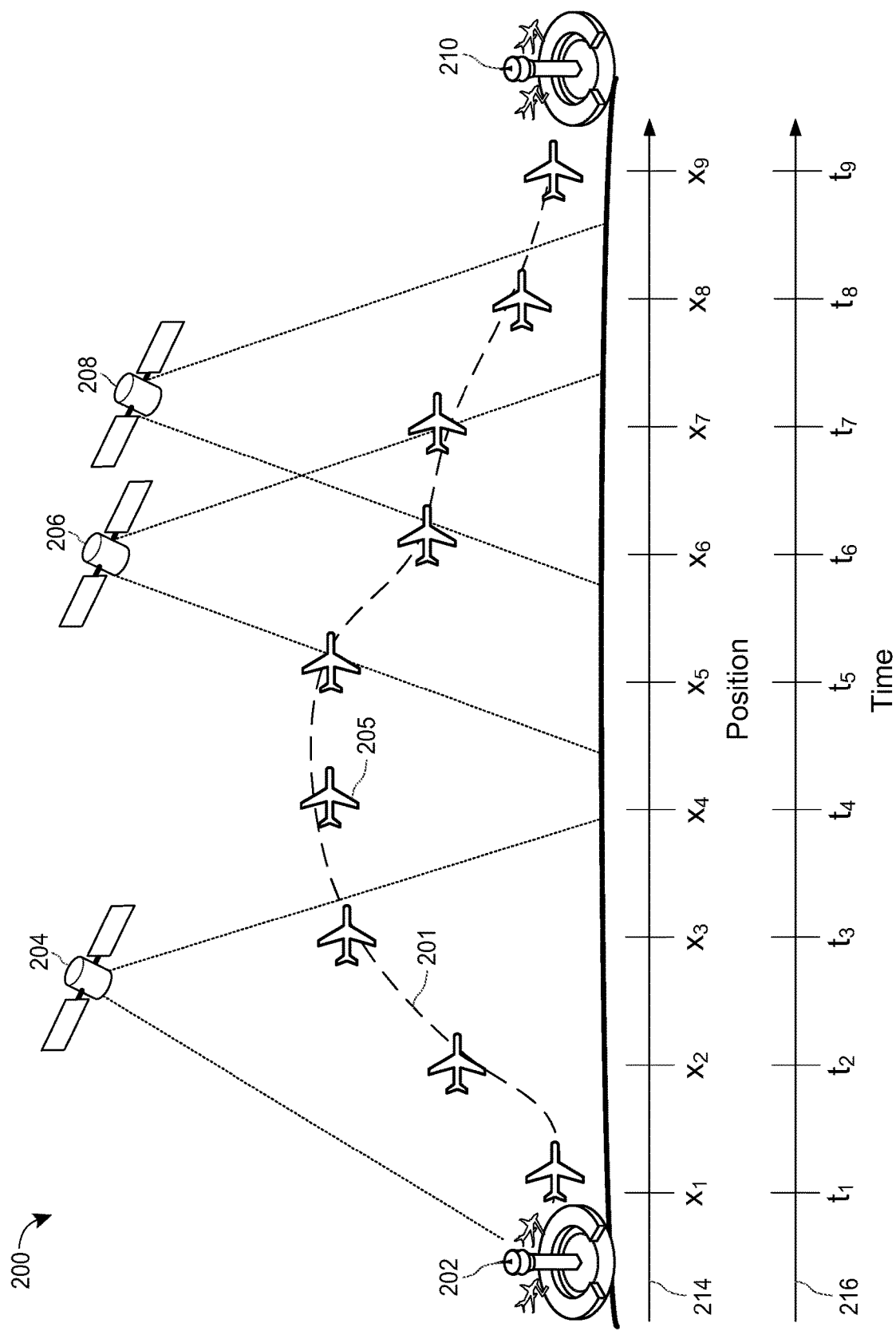
FIG. 2 illustrates a vehicle moving along a route while communicating via one or more links provided by one or more satellites.

Referring now to FIGS. 2-3, these figures illustrate an example route 201 and an example LSP 364 for the route 201. FIG. 2 illustrates an environment 200 including a vehicle 205 (which may be the vehicle 105 of FIGS. 1A-1B) moving along the route 201 while communicating via one or more links provided by a plurality of satellites 204, 206, and 208. The satellites 204, 206, 208 may be part of a satellite communication system that provides a satellite communication link, such as the satellite communication link 157 of FIGS. 1A-1B, to the vehicle 205. In some cases, the vehicle 205 may travel completely along the scheduled route 201 from an origination point 202 to a destination point 210. In other cases, the actual route may be different from the planned route 201 because the vehicle 205 may deviate from its planned route 201 due to current conditions such as weather and/or traffic. The route 201 may pass through geographic positions $x_1$-$x_{10}$, illustrated by axis 214, at times $t_1$-$t_{10}$, illustrated by axis 216. At time $t_2$, for example, the vehicle 205 is at scheduled to be at position $x_2$.

As the vehicle 205 moves along the route 201, the quality of the satellite communication link may vary based on the location of the vehicle 205 and the time at which the vehicle 205 is at the location. For example, from times $t_1$-$t_3$, the vehicle 205 is within the beam coverage area of the satellite 204. At time $t_4$, the vehicle 205 is outside of the coverage area provided by the beams of the satellites 204, 206, and 208. From times $t_5$-$t_8$, the vehicle transitions from the beam coverage area of the satellite 206 to the beam coverage area of the satellite 208, before arriving at the destination point 210 at time $t_9$.

With simultaneous reference to FIG. 3, depicted in an exemplary LSP 364 that may be stored at a central server, such as the LSP 164 of FIGS. 1A-1B, or stored at a network controller, such as the local LSP 124 of FIGS. 1A-1B. The LSP 364 may include predicted link characteristics for one or more communication links during the course of the route 201 depicted in FIG. 2. The LSP 364 may be based on historical link characteristics (e.g., historical link characteristics received from the historical link database 190) corresponding to the route 201. If the vehicle 205 has an upcoming trip or is currently traveling along the route 201, the LSP 364 may include entries containing predicted link rates based on current information retrieved from the current link data source 192. The depicted LSP 364 includes entries relating to one link, but, in other embodiments, the LSP 364 may include entries corresponding to multiple links.

In the depicted embodiment, the LSP 364 may correspond to a table 302 of data with entries including a time 325, an event 326 corresponding to the time, a predicted link rate 327, a cost 328. While FIG. 3 depicts columns 325-328, the LSP 364 may include other predicted information related to the links communicatively connected to the vehicle 205. For each time 325, the LSP 364 may include a description of the event 326 predicted to occur at each time, such as "Start of Flight," "In Flight," "Leave Coverage," "Enter Coverage," "Start Beam Switch," "End Beam Switch," and "End of Flight." Further, for each time 325, the LSP 364 includes a link rate 327 (e.g., a number of Megabits per second (Mbps)) and a cost 328. The cost may correspond to a numerical value out of a ten-point scale or similar quantitative measure of the relative cost of providing the link. Alternatively or additionally, the cost may be a qualitative description, such as "low" or "high." The predicted cost of a link corresponds to how expensive it is for the communication services provider to provide the link to the vehicle 205 and/or how expensive it is for user devices to access the link, thereby enabling least cost routing. This may be particularly useful in embodiments where the LSP 364 includes data describing multiple links. If the link rate is zero at a particular time (e.g., time $t_3$ when the vehicle 205 has left a coverage area), the cost may be NA because no link is actually provided at that time.

An application (such as the application 132 of FIG. 1B) of the user device 110 (such as the user devices 110 of FIGS. 1A-1B) may access the LSP 364 in any of the ways described above with respect to the LSPs 124 and/or 164 of FIGS. 1A-1B. Responsive to receiving the LSP 364, a portion of the LSP 364, or an indication based on the LSP 364, the user device and/or applications executing thereon may take various actions. As one example, the application may modify a behavior while vehicle is moving from the origination point to the destination point or prior to the vehicle beginning the route 201. In one scenario, the LSP 364 may indicate that a predicted link rate at a particular future time is below the minimum usable data rate for the application or a specific capability of the application. In response, the application may take appropriate to steps to optimize its behavior given the low link rate. To this end, the application may pre-download or cache content before the route 201 begins (e.g., before time $t_1$), or during the route 201 at times when the link service profile indicates that the link rates will be above the minimum usable data rate of the application (e.g., at times $t_1$-$t_3$ and $t_8$-$t_9$ if the minimum usable data rate of the application is 6 Mbps). By caching the data, the application may prepare for the predicted low link rate and continue to provide services related to the content even during the time corresponding to the low link rate. Similarly, based on the LSP 364, the application may not attempt to perform a download at a particular time given the predicted link rates (e.g., at times $t_4$-$t_7$ when the link rates 327 are 0-5 Mbps). Additionally or alternatively, the application may change the rate at which it performs a download in view of the predicted link rates.

Figure 4A:
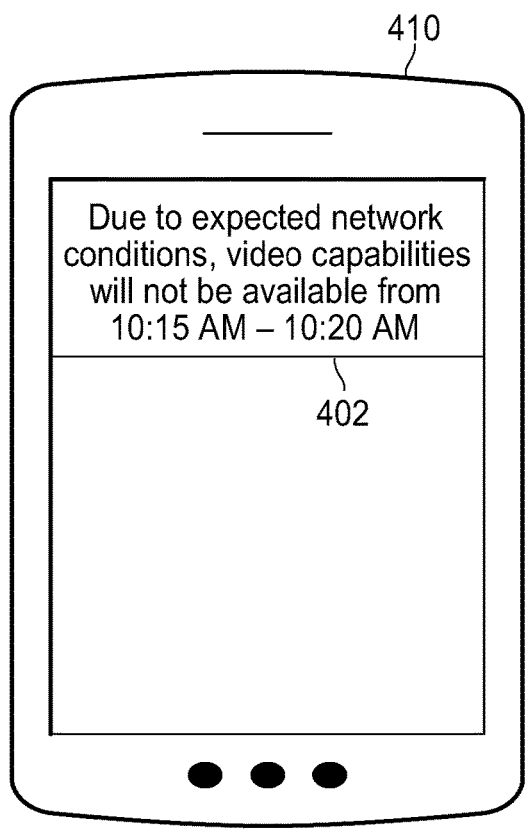
FIGS. 4A-4B are exemplary interfaces displayed on a user device, such as one of the user devices of FIG. 1, associated with an application behavior modified in accordance with a link service profile.

The application may also present alerts, warnings, and/or notifications indicating to the user that one or more capabilities of the application are unavailable or will be unavailable during the route 201 based on the LSP 364. Notifications may include information included in the LSP 364 or a predicted capability of the application based on the LSP 364. For instance, the notification may indicate that a capability of the application will be unavailable or interrupted during the route 201. With simultaneous reference to FIG. 4A, illustrated is an example interface of a user device 410 (such as the user device 110 of FIGS. 1A-1B) that is executing the application. The user device 410 may receive an indication based on the LSP 364 including a predicted link rate. For example, the application may determine that the predicted link rate is below a threshold for streaming video. In response, the application may present, via a graphical user interface (GUI) of the user device 410, an alert 402 indicating that video capabilities will not be available during a particular time period of the route 201 corresponding to the low predicted link rate.

Figure 4B:
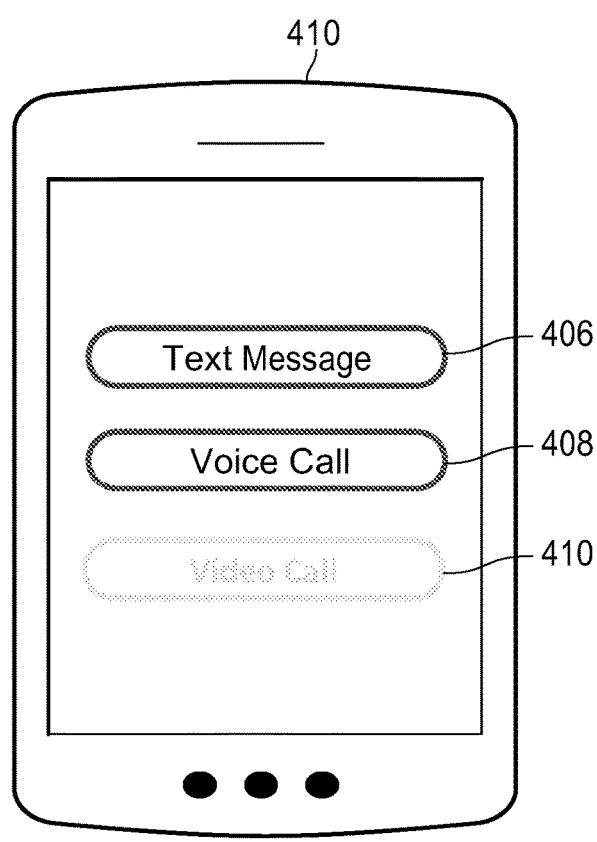

In addition to notifications, the application may change how various GUIs present information to a user. For instance, the application may alter the options displayed to the user to indicate that options of the application are not available at given predicted link rates. The application may grey-out or hide options that are unavailable or that will be blocked. Alternatively, the application may simply not provide the options that would require data rates higher than the predicted link rates. In addition, the application may highlight or otherwise indicate application capabilities that are allowed or that will be allowed based on the predicted link rates. With simultaneous reference to FIG. 4B, illustrated is an example interface of the user device 410 associated with the application. The application may be a messaging application with multiple capabilities, and may present corresponding user-selectable options, such as a text message option 406, a voice call option 408, and a video call option 410. The application, based on a received indication of the LSP 364, may determine that video calls will be unavailable during the route 201, and may correspondingly grey-out video call option 410.

As another example, the application may be a video streaming application, such as Netflix®, or other application that streams data to the user device from a media server (such as the media server 170 of FIGS. 1A-1B). The application may request information relating to the LSP 364 from the network controller of the vehicle 205. In response, the network controller may provide predicted link rates of the LSP 364. Based on the indication, the application may determine when to download video content in order to provide the user with un-interrupted video services. For instance, if the user has requested a movie, the application may fully download the movie when the links the user device 410 has a predicted link rate sufficiently high enough to properly support the vide-content download. When the vehicle 205 enters an area corresponding to low predicted link rates, the application will not need to access any new content and the video functionality will still be available to the user.

As another example, the application may be a calendar application. Based on an indication of the LSP 364, the application may determine that internet services may be unavailable during a scheduled online meeting. The application may display a notification to the user and/or other meeting participants that the meeting will be unavailable, will start late, or will be interrupted.

As a further example, the application may modify its behavior to optimize link costs. For instance, if the received indication based on the LSP 364 indicates that a link is more expensive at time $t_2$ than time $t_1$, then the application may perform a download at time $t_1$ rather than time $t_2$.

In various implementations, the application may modify multiple behaviors based on a received indication of the LSP 364. For instance, the application may both grey out a capability and display a notification to the user. In addition, multiple applications executing on the user device 410 may modify their behaviors in view of the LSP 364. Each application may modify their respective behavior in different manners.

Figure 5:
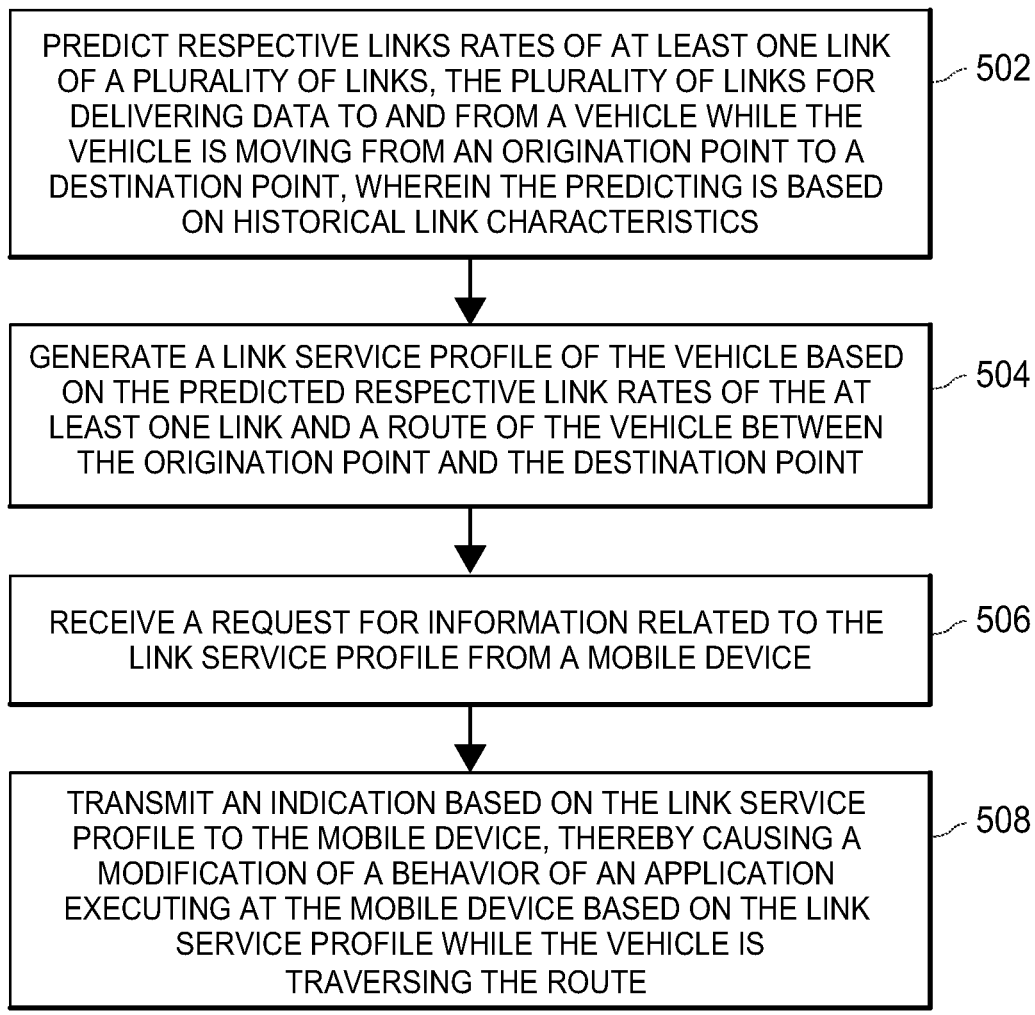
FIG. 5 is an example flow diagram of an example method for modifying application performance in view of link conditions.

FIG. 5 is a flow diagram illustrating an example method 600 for modifying application performance in view of link conditions, which may be implemented in the environment 100 of FIGS. 1A-1B and/or 200 of FIG. 2. More particularly, the method 500 may be executed by, for example, a central server located at a terrestrial location (e.g., the central server 160 of FIGS. 1A-1B) off-board a vehicle (e.g., the vehicles 105 or 205 of FIGS. 1A-1B and 2, respectively), a network controller located on-board the vehicle (e.g., the network controller 120 of FIGS. 1A-1B), or by the central server in conjunction with the network controller.

The method 500 begins at block 502 when a computing device (e.g., network controller and/or central server) of a system that provides communication services to mobile devices (e.g., user devices 110 of FIGS. 1A-1B, user device 410 of 4A-4B) on-board a vehicle predicts respective link rates of at least one link of a plurality of links. The plurality of links deliver data to and from the vehicle while the vehicle is moving from an origination point to a destination point along a route (e.g., the route 201 of FIG. 2). The plurality of links may include a satellite communication link (e.g., the satellite communication link 157 of FIGS. 1A-1B), an ATG communication link (e.g., the ATG communication link 147 of FIGS. 1A-1B), or an on-board communication link (e.g., the on-board communication link 137 of FIGS. 1A-1B). At least one of the plurality of links, for example, may support long term evolution (LTE) communications. The computing device predicts the link rates based on historical link characteristics (e.g., received from the historical link database 190 of FIG. 1B). The historical link characteristics may be characteristics of the plurality of links during historical routes of a plurality of vehicles.

In some scenarios, the computing device may also predict the link rates or update the predicted link rates based on current link characteristics of the plurality of links (e.g., link characteristics of the plurality of links while the vehicle is moving along a route). The computing device may also predict additional parameters of the at least one link in addition to link rates based on the historical and/or current link characteristics. The additional parameters may include a peak information rate, a latency (e.g., round-trip time), a status, or a cost.

At block 504, the computing device generates a link service profile (LSP) (e.g., the LSP 164 or the local LSP 124 of FIGS. 1A-1B, or the LSP 364 of FIG. 3) of the vehicle based on the predicted respective link rates of the at least one link and a route of the vehicle between the origination point and the destination point. The LSP may include the predicted respective link rates (e.g., the link rates 327 of FIG. 3), and may also include additional predicted parameters (e.g., the cost 328 of FIG. 3).

At block 506, the computing device receives a request for information related to the LSP from a mobile device. The request may be a request for an LSP stored at the computing device and/or a request to subscribe to future transmissions related to the LSP. The request may be received from the mobile device either prior to the mobile device being on-board the vehicle or while the mobile device is on-board the vehicle.

At block 508, the computing device transmits an indication based on the LSP to the mobile device, thereby causing a modification of a behavior of an application executing at the mobile device based on the LSP while the vehicle is traversing the route. For example, the application may display the interfaces depicted in FIGS. 4A-4B). The computing device may format the indication in accordance with an API and transmit the formatted indication to the mobile device. If, for example, the computing device is a central server, the central server may transmit the indication based on the LSP to a second computing device located on-board the vehicle, such as a network controller. This transmission causes the second computing device to transmit the indication based on the LSP to the mobile device. The indication may include, for example, the predicted respective link rates of the at least one link or other predicted characteristics of the at least one link.

If the request received at block 506 was a request to subscribe to future transmissions related to the LSP, then at block 506, the computing device may periodically transmit the indication based on the LSP to the mobile device while the vehicle is moving from the origination point to the destination point (e.g., at time intervals, or when the vehicle reaches certain states, such as flight states in the case of an aircraft).

The method 500 may also include receiving an indication of a current condition relating to the plurality of links, the current condition corresponding to a change to the route of the vehicle or to current link characteristics of the plurality of links. The computing device may update the predicted respective link rates (and other predicted link characteristics), and correspondingly update the LSP to reflect the updated predicted link rates. In response to updating the LSP, the computing device may transmit an indication based on the updated LSP to the mobile device. In some scenarios, the computing device may broadcast the updated LSP to mobile devices connected to the on-board network, or may broadcast the updated LSP to mobile devices from which the computing device received a subscription request.

Figure 6:
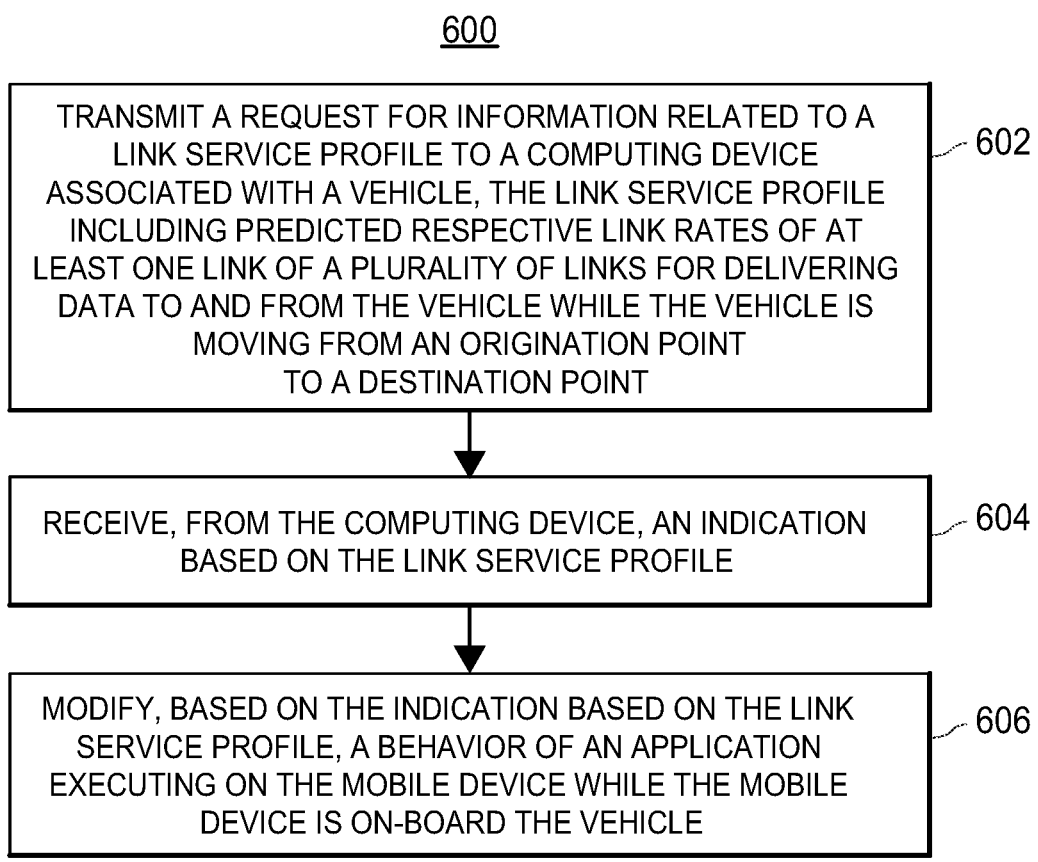
FIG. 6 is an example flow diagram of an example method which may be performed by a user device to modify application performance in view of link conditions.

FIG. 6 is a flow diagram illustrating an example method 600 for modifying application performance in view of link conditions, which may be implemented by a mobile device (e.g., the user devices 110 of FIGS. 1A-1B, the user device 410 of FIGS. 4A-4B).

The method 600 begins at block 602 when the mobile device transmits a request for information related to an LSP (e.g., the LSP 164 or the local LSP 124 of FIGS. 1A-1B, or the LSP 364 of FIG. 3) to a computing device (e.g., the network controller 120 or the central server 160 of FIGS. 1A-1B) associated with a vehicle (e.g., the vehicle 105 of FIG. 1A or the vehicle 205 of FIG. 2). The LSP includes predictive respective link rates of at least one link of a plurality of links for delivering data to and from the vehicle while the vehicle is moving from an origination point to a destination point. The plurality of links may include a satellite communication link (e.g., the satellite communication link 157 of FIGS. 1A-1B), an ATG communication link (e.g., the ATG communication link 147 of FIGS. 1A-1B), or an on-board communication link (e.g., the on-board communication link 137 of FIGS. 1A-1B). The mobile device may format the request in accordance with an API before transmitting the request to the computing device. Further, the mobile device may transmit the request before or while the mobile device is located on-board the vehicle.

Moreover, the mobile device may detect that it is on-board the vehicle (e.g., by detecting an SSID of the on-board network) and establish a connection with the at least one link of the plurality of links. In response to establishing the connection with the at least one link, the mobile device may transmit the request for information related to the link service profile.

At block 604, the mobile device receives, from the computing device, an indication based on the LSP. At block 606, the mobile device modifies a behavior of an application (e.g., the application 132 of FIG. 1B) executing on the mobile device while the mobile device is on-board the vehicle based on the received indication.

The mobile device may modify the behavior of the application in various ways. For example, the mobile device may modify a download of content to the mobile device via the application based on the LSP (e.g., by preventing a download, changing a rate of download, or pre-downloading content at a time the indication indicates the predicted link rate is sufficient to support the download). The mobile device may modify how the application is displayed on a GUI (e.g., by indicating on the GUI that a capability of the application is unavailable, greying out a portion of the GUI corresponding to an unavailable capability, or causing the application to display a notification indicating at least one of information included in the LSP or a predicted capability of the application based on the LSP). The mobile device may modify the application behavior while the vehicle is moving from the origination point to the origination point.

Figure 7:
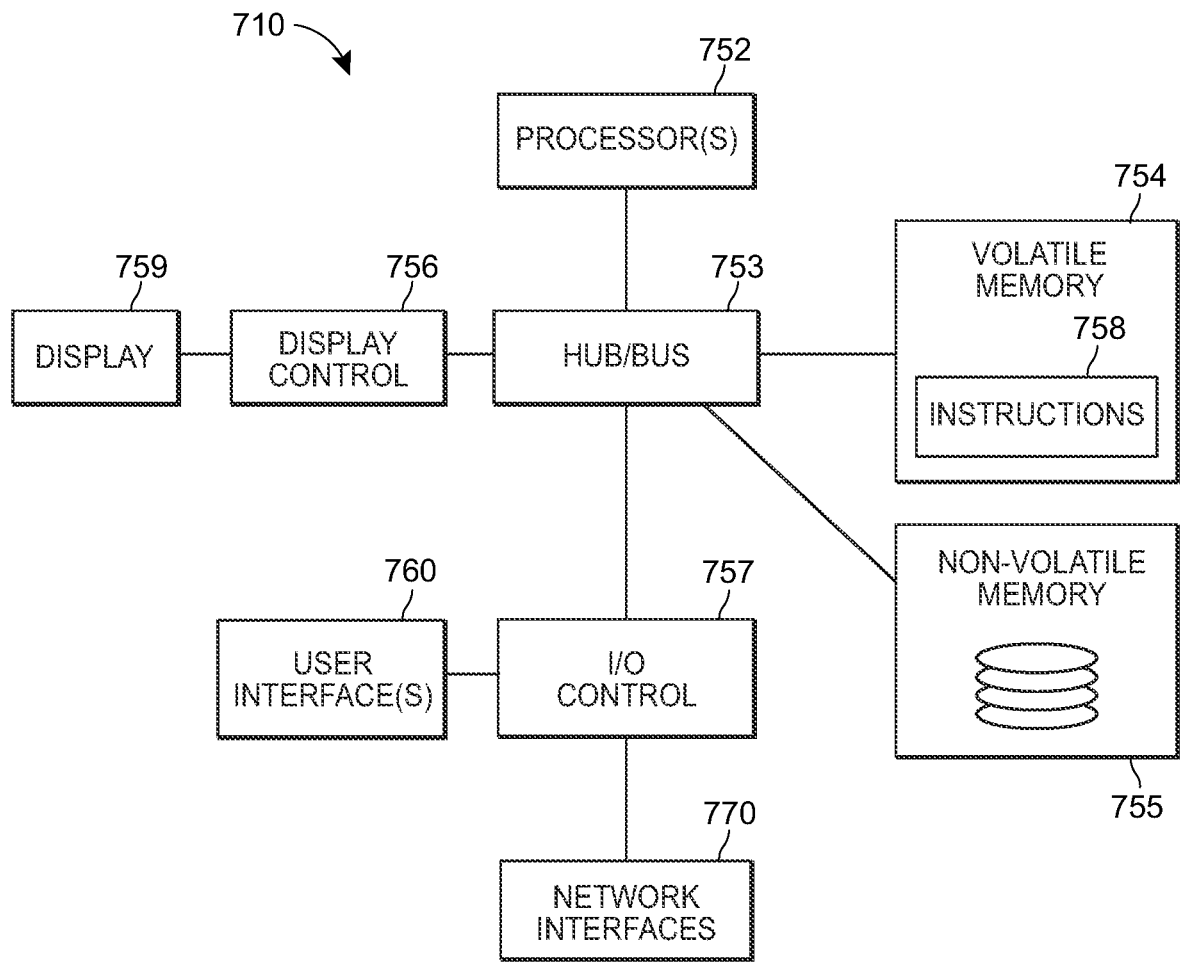
FIG. 7 is a block diagram of a user device that facilitates the techniques for modifying application performance disclosed herein.

FIG. 7 illustrates a block diagram of a user device 710, such as a user device of the user devices 110 and 410 of FIGS. 1A-1B and 4A-4B, that performs the techniques for modifying application performance disclosed herein. The user device 710 may include, for example, one or more central processing units (CPUs) or processor(s) 752, and one or more busses or hubs 753 that connect the processor(s) 752 to other elements of the user device 710, such as a volatile memory 754, a non-volatile memory 755, a display controller 756, and an I/O controller 757. The volatile memory 754 and the non-volatile memory 755 may each include one or more non-transitory, tangible computer readable storage media such as random access memory (RAM), read only memory (ROM), FLASH memory, a biological memory, a hard disk driver, a digital versatile disk (DVD) disk drive, etc.

In an embodiment, the memory 754 and/or the memory 755 may store instructions 758 that are executable by the processor(s) 752. In a user device configured to modify application performance in view of link conditions, the instructions may be instructions to transmit requests for information related to a LSP (e.g., LSP 124, the LSP 124, or the LSP 364) to a computing device (e.g., to the network controller 120) and receive indications based on the LSP. For example, the instructions may configure the user device to format a request in accordance with an API. The instructions may also include instructions for modifying an application behavior based on a received indication of the LSP.

In an embodiment, the display controller 756 may communicate with the processor(s) 752 to cause information to be presented on a connected display device 759. In an embodiment, the I/O controller 757 may communicate with the processor(s) 752 to transfer information and commands to/from the user interface 760, which may include a mouse, a keyboard or key pad, a touch pad, click wheel, lights, a speaker, a microphone, etc. In an embodiment, at least portions of the display device 759 and of the user interface 760 are combined in a single, integral device, e.g., a touch screen. Additionally, data or information may be transferred to and from the user device 710 via a network interface 770. In some embodiments, the user device 710 may include more than one network interface 770, such as a wireless interface and a wired interface.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A method for modifying application performance in view of link conditions, comprising: predicting, by a computing device of a system that provides communication services to mobile devices on-board a vehicle, respective link rates of at least one link of a plurality of links, the plurality of links for delivering data to and from the vehicle while the vehicle is moving from an origination point to a destination point, wherein the predicting is based on historical link characteristics; generating, by the computing device, a link service profile of the vehicle based on the predicted respective link rates of the at least one link and a route of the vehicle between the origination point and the destination point; receiving a request for information related to the link service profile from a mobile device; and transmitting, to the mobile device, an indication based on the link service profile, thereby causing a modification of a behavior of an application executing at the mobile device based on the link service profile while the vehicle is traversing the route.

2. The method of the previous aspects, wherein the computing device is located on-board the vehicle.

3. The method of aspect 1, wherein the computing device is located at a terrestrial location off-board the vehicle.

4. The method of any combination of the preceding aspects, wherein predicting the respective link rates of the at least one link further comprises: predicting the respective link rates based on current link characteristics of the plurality of links.

5. The method of any combination of the preceding aspects, wherein the historical link characteristics are characteristics of the plurality of links during historical routes of a plurality of vehicles.

6. The method of any combination of the preceding aspects, wherein transmitting the indication based on the link service profile to the mobile device comprises: transmitting the indication based on the link service profile to a second computing device located on-board the vehicle; wherein transmitting the indication based on the link service profile causes the second computing device to transmit the indication based on the link service profile to the mobile device.

7. The method of any combination of the preceding aspects, wherein transmitting the indication based on the link service profile comprises: formatting, in accordance with an application programming interface (API), the indication based on the link service profile; and transmitting, to the mobile device, the formatted indication.

8. The method of any combination of the preceding aspects, wherein the indication includes the predicted respective link rates of the at least one link.

9. The method of any combination of the preceding aspects, wherein the request for information is a request to subscribe to future transmissions related to the link service profile 10. The method of the previous aspect, wherein transmitting the indication based on the link service profile to the mobile device comprises: periodically transmitting the indication based on the link service profile to the mobile device while the vehicle is moving from the origination point to the destination point.

11. The method of aspect 9, further comprising: receiving, at the computing device, an indication of a current condition relating to the plurality of links, the current condition corresponding to at least one of a change to the route of the vehicle or current link characteristics of the plurality of links; updating, by the computing device, the predicted respective link rates based on the received indication of the current condition; updating, by the computing device, the link service profile based on the predicted respective link rates; and in response to updating the link service profile, transmitting an indication based on the updated link service profile to the mobile device.

12. The method of any combination of the preceding aspects, wherein receiving the request for information related to the link service profile comprises: receiving the request for information related to the link service profile from the mobile device while the mobile device is on-board the vehicle.

13. The method of any combination of aspects 1-11, wherein receiving the request for information related to the link service profile comprises: receiving the request for information related to the link service profile from the mobile device prior to the mobile device being on-board the vehicle.

14. The method of any combination of the preceding aspects, wherein the at least one link of the plurality of links is: a satellite communications link, an air-to-ground communications link, or a link of a network on-board the vehicle.

15. The method of any combination of the preceding aspects, wherein the at least one link of the plurality of links supports long term evolution (LTE) communications.

16. The method of any combination of the preceding aspects, further comprising: predicting, based on the historical link characteristics, one or more parameters of the at least one link, the one or more parameters including at least one of: a peak information rate, a round-trip time, a status, or a cost; and wherein generating the link service profile comprises: generating the link service profile based on the one or more parameters of the at least one link.

17. A computer-implemented method performed by a mobile device to modify application performance in view of link conditions, the method comprising: transmitting, to a computing device associated with a vehicle, a request for information related to a link service profile, the link service profile including predicted respective link rates of at least one link of a plurality of links for delivering data to and from the vehicle while the vehicle is moving from an origination point to a destination point; receiving, from the computing device, an indication based on the link service profile; modifying, based on the indication based on the link service profile, a behavior of an application executing on the mobile device while the mobile device is on-board the vehicle.

18. The method of the previous aspect, further comprising: formatting, in accordance with an application programming interface (API), the request for information based on the link service profile before transmitting the request to the computing device.

19. The method of any combination of aspects 17-18, wherein the predicted respective link rates are based on historical link characteristics.

20. The method of any combination of aspects 17-19, wherein transmitting the request for information based on the link service profile comprises: transmitting the request while the mobile device is on-board the vehicle.

21. The method of any combination of aspects 17-20, wherein modifying the behavior of the application comprises: modifying a download of content to the mobile device via the application based on the link service profile by at least one of: preventing the download, changing a rate of the download, or caching the content of the download.

22. The method of any combination of aspects 17-21, wherein modifying the behavior of the application comprises: modifying how the application is displayed on a graphical user interface (GUI) based on the link service profile.

23. The method of the previous aspect, wherein modifying how the application is displayed comprises: indicating, on the GUI, that a capability of the application is unavailable.

24. The method of the previous aspect, wherein indicating that the capability of the application is unavailable comprises: greying out a portion of the GUI corresponding to the capability that is unavailable.

25. The method of aspect 22, wherein modifying how the application is displayed comprises: causing the application to display a notification indicating at least one of information included in the link service profile or a predicted capability of the application based on the link service profile.

26. The method of any combination of aspects 17-25, wherein modifying the behavior of the application comprises: modifying the behavior of the application while the vehicle is moving from the origination point to the destination point.

27. The method of any combination of aspects 17-26, wherein transmitting the request for information comprises: detecting that the mobile device is on-board the vehicle; and establishing a connection with the at least one link of the plurality of links; in response to establishing the connection with the at least one link, transmitting the request for information related to the link service profile.

28. A non-transitory computer-readable storage medium storing processor-executable instructions, that when executed cause one or more processors to: transmit, to a computing device associated with a vehicle, a request for information related to a link service profile, the link service profile including predicted respective link rates of at least one link of a plurality of links for delivering data to and from the vehicle while the vehicle is moving from an origination point to a destination point; receive, from the computing device, an indication based on the link service profile; modify, based on the indication based on the link service profile, a behavior of an application executing on the mobile device while the mobile device is on-board the vehicle.

What is claimed:

1. A method for modifying application performance in view of link conditions, comprising:
predicting, by a link service profile application executing on a network controller on-board a vehicle prior to the vehicle starting a planned route, respective link rates of at least one link of a plurality of links based on historical link characteristics and the planned route, wherein the planned route indicates an origination point, a destination point, and scheduled locations therebetween, the plurality of links for delivering data to and from the network controller while the vehicle is moving from the origination point to the destination point, the network controller providing an on-board network on the vehicle;
generating, by the link service profile application, a link service profile of the vehicle based on the predicted respective link rates of the at least one link;
receiving, by the link service profile application over the on-board network, a request for information related to the link service profile from a mobile device; and
providing, from the link service profile application to the mobile device over the on-board network, an indication based on the link service profile, wherein the indication causes a modification of a behavior of an application executing at the mobile device while the vehicle is traversing the route.

2. The method of claim 1, wherein predicting the respective link rates of the at least one link further comprises:
predicting the respective link rates based on current link characteristics of the plurality of links.

3. The method of claim 1, further comprising:
formatting, by the link service profile application in accordance with an application programming interface (API), the indication based on the link service profile.

4. The method of claim 1, wherein the request for information is a request to subscribe to future transmissions related to the link service profile.

5. The method of claim 4, wherein providing the indication based on the link service profile to the mobile device comprises:
periodically providing the indication based on the link service profile to the mobile device while the vehicle is moving from the origination point to the destination point.

6. The method of claim 4, further comprising:
receiving, at the link service profile application, an indication of a current condition relating to the plurality of links, the current condition corresponding to at least one of a route change of the vehicle or current link characteristics of the plurality of links;
updating, by the link service profile application, the predicted respective link rates based on the received indication of the current condition;
updating, by the link service profile application, the link service profile based on the predicted respective link rates; and in response to updating the link service profile, transmitting, by the link service profile application, an indication based on the updated link service profile to the mobile device.

7. The method of claim 1, wherein the at least one link of the plurality of links is: a satellite communications link, an air-to-ground communications link, or a link of a network on-board the vehicle.

8. The method of claim 1, wherein predicting the respective link rates of the at least one link of the plurality of links further comprises:
predicting one or more parameters of the at least one link, the one or more parameters including at least one of: a peak information rate, a round-trip time, a status, or a cost;
wherein generating the link service profile comprises:
generating the link service profile based on the one or more parameters of the at least one link.

9. A computer-implemented method performed by a mobile device to modify application performance in view of link conditions, the method comprising:
providing, to a link service profile application executed by a network controller on-board a vehicle over an on-board network prior to the vehicle starting a route, a request for information related to a link service profile, the link service profile including predicted respective link rates of at least one link of a plurality of links for delivering data to and from the network controller while the vehicle is moving along a route from an origination point to a destination point, and the network controller providing the on-board network on the vehicle;
receiving, from the link service profile application over the on-board network prior to the vehicle starting the route, an indication based on the link service profile; and
modifying, based on the indication, a behavior of a mobile application executing on the mobile device while the mobile device is on-board the vehicle.

10. The method of claim 9, further comprising:
formatting, in accordance with an application programming interface (API), the request for information before providing the request to the link service profile application,
wherein modifying the behavior of the mobile application comprises modifying a download of content to the mobile device via the mobile application by caching the content of the download.

11. The method of claim 9, wherein modifying the behavior of the mobile application comprises:
modifying how the mobile application is displayed on a graphical user interface (GUI).

12. The method of claim 11, wherein modifying how the mobile application is displayed comprises:
indicating, on the GUI, that a capability of the mobile application will be unavailable at certain times during the route; and
causing the mobile application to display a notification indicating at least one of information included in the indication or a predicted capability of the mobile application based on the indication.

* * * * *